P. L. GIBBS.
Improvement in Leeching-Nuts.
No. 127,336. Patented May 28, 1872.
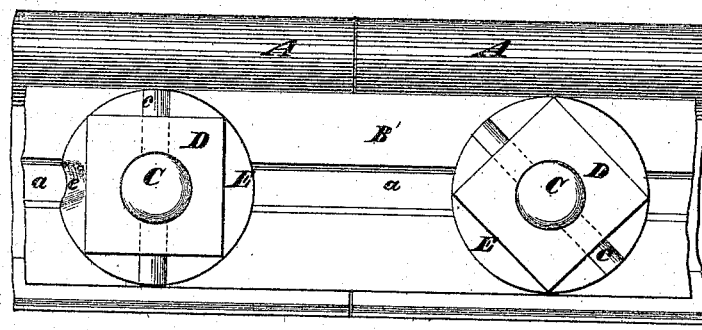
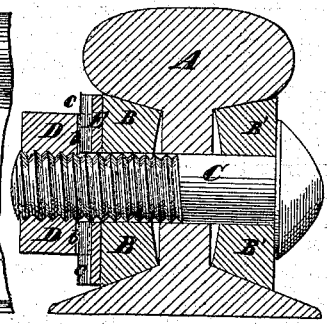
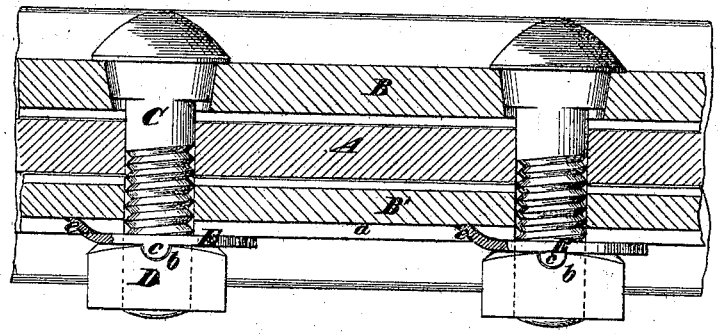
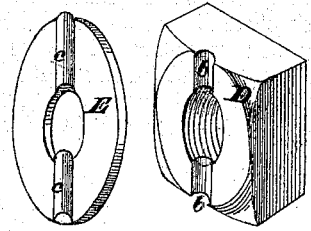

UNITED STATES PATENT OFFICE.

PIERRE L. GIBBS, OF DUNLEITH, ILLINOIS.

IMPROVEMENT IN DEVICES FOR LOCKING NUTS.

Specification forming part of Letters Patent No. 127,336, dated May 28, 1872.

Specification of a Device for Locking Nuts, invented by PIERRE L. GIBBS, of Dunleith, in the county of Jo Daviess and State of Illinois.

This invention is especially designed for locking the nuts of railway fish-joints. It consists in the combination, with the fish-plates plates or other plates used to form the joint and the nuts of the bolts securing the plates, of malleable washers which have ribs formed on their outer faces to fit grooves in the inner faces of the nuts so that when their edges are tamped into a groove in the plates the washers are locked both with the plates and with the nuts, and the latter prevented from turning and working loose.

In the accompanying drawing, Figure 1 is a side view of a fish-joint having my locking device applied to it. Fig. 2 is a transverse section taken at one of its bolts. Fig. 3 is a horizontal section, also taken at the bolts. Fig. 4 is a perspective view of a washer detached; and Fig. 5, a similar view of a nut.

Similar letters of reference indicate corresponding parts in all the figures.

A A represent the ends of two rails, and B B' represent fish-plates applied thereto. The fish-plate B has ellipsoidal holes formed in it for the reception of necks of corresponding shape, formed on the bolts C C, and the other fish-plate, B', has a longitudinal groove, $a$, formed along its middle. The bolts C C secure the fish-plates in place, and have nuts D D applied to their outer ends. These nuts have grooves $b$ on their inner or back sides. E E are washers, by which the nuts are locked. They are made of malleable metal, and have struck upon their outer sides ribs $c$, which fit the grooves in the nuts. By this means the nuts are prevented from turning independently of the washers. After the nuts and their washers have been fitted to the ends of the bolts, and the nuts screwed up in place, a portion of the edge of each washer is hammered or tamped into the groove $a$ in the contiguous fish-plate B', as shown at $e$, in Figs. 1 and 3, and the washer is thereby locked to the bar, and, owing to its nut being locked to the washer, the former is locked to the fish-plate also. Not only may the nuts be screwed up by an ordinary wrench, but they may also be unscrewed with this instrument by a sufficient application of force, thus obviating the necessity of a special tool for raising the tamped portions of the washers.

Claim.

A flexible washer, formed with a solid rib, $c$, for operation in combination with the groove $b$ in the nut, and groove $a$ in the fish-bar, as shown and described.

PIERRE L. GIBBS.

Witnesses:
F. H. WOODWORTH,
F. P. WILCOX.